United States Patent [19]

Travlos et al.

[11] Patent Number: 4,549,347
[45] Date of Patent: Oct. 29, 1985

[54] CONTACT INSERTION AND WIRE LAY ROBOTIC END EFFECTOR APPARATUS

[76] Inventors: Constantine M. Travlos, 7924 Springway Rd., Baltimore, Md. 21204; James A. Henderson, P.O. Box 366, Finksburg, Md. 21048; Mark Weixel, 4671 Beechwood Rd., Ellicott City, Md. 21043

[21] Appl. No.: 610,913

[22] Filed: May 16, 1984

[51] Int. Cl.$^4$ .............................................. B23P 19/00
[52] U.S. Cl. ..................................... 29/749; 29/33 M; 29/564.1; 226/146; 226/167
[58] Field of Search ................ 29/33 R, 33 M, 564.1, 29/748, 749, 819, 820, 822; 226/146, 149, 167, 181

[56] References Cited

U.S. PATENT DOCUMENTS

| | | | |
|---|---|---|---|
| 2,649,867 | 8/1953 | Powell | 140/129 |
| 3,612,369 | 10/1971 | Grebe et al. | 226/24 |
| 3,626,431 | 12/1971 | Thierri et al. | 29/748 X |
| 4,043,017 | 8/1977 | Folk et al. | 29/749 |
| 4,051,594 | 10/1977 | Kindig | 29/596 |
| 4,235,015 | 11/1980 | Funcik et al. | 29/749 X |

FOREIGN PATENT DOCUMENTS 26350  4/1981  European Pat. Off. ............ 226/181

Primary Examiner—Fred Silverberg

[57] ABSTRACT

Contact insertion and wire lay apparatus for manufacture of wire harnesses which provides for insertion of a contact affixed to the trailing end of a wire segment after wire lay. The invention provides for gripping a wire segment while the segment is caused to lay in a desired configuration. A pair of sets of tip jaws enable forward and trailing end contacts of the wire segment to be inserted into selected contact holding devices. In addition, the apparatus is arranged to facilitate lateral receipt and rejection of the wire segments.

2 Claims, 5 Drawing Figures

CONTACT INSERTION AND WIRE LAY ROBOTIC END EFFECTOR APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates to an apparatus for automated wire harness manufacture, and, more particularly, to a robotically controlled apparatus for automated wire lay which is capable of insertion of contacts affixed to the leading and the trailing ends of wire segments into respective contact holding devices, for use in wire harness manufacture.

As is known to those of ordinary skill in the art, a completed wire harness typically comprises a multiplicity of wires configured in a desired bundled layout, with each end of each wire being terminated in a desired manner. For example, each such wire may have a contact affixed to each of its ends, where each contact is to be inserted into a respective contact holding device, such as into a connector plug. In complex arrangements, numerous wires of varying lengths and types can comprise a single wire harness. Furthermore, such wires may require differing contact configurations at their respective ends. In such a situation, the task of producing such wire harnesses has been known to be a particularly laborious activity.

In the prior art, devices are known to effect wire feeding and lead making. Such devices, however, suffer from an inability to effect wire lay in combination with contact insertion of both the leading and trailing ends of a wire being manipulated. Furthermore, during development of an apparatus to cure the above insufficiency, it has been found to be desireable to enable any such apparatus to be operable independent of contact style, and independent of wire length or cross-section. It has been found yet further desireable that the grasping portion of any such apparatus be configured to enable rapid engagement and disengagement with any selected wire segment to be manipulated.

SUMMARY OF THE INVENTION

In accordance with the teachings of the present invention, a contact insertion and wire lay apparatus is disclosed for improved manufacture of wire harnesses, where each harness can be terminated in a plurality of contact holding devices. Any such harness may be constructed of a plurality of pre-fabricated wire segments, where each wire segment may comprise a length of wire with one contact affixed to each of the leading and trailing ends thereof. The invention provides for gripping a wire segment while the segment is caused to lay in a desired configuration. Thereafter, a set of tip jaws enables a trailing end contact to be inserted into a selected contact holding device. This operation may be prefaced, prior to wire lay, by insertion into another contact holding device of a contact affixed to the leading end of the wire segment, by means of another set of tip jaws. The apparatus is arranged to facilitate lateral receipt and rejection of wire segments.

It is therefore an object of the present invention to provide an improved apparatus for automated wire harness production.

It is an additional object of the present invention to provide an automated apparatus for wire harness production capable of effecting controlled wire lay of a wire segment and of thereafter inserting a contact affixed to the trailing end of the wire under manipulation into a contact holding device.

It is a further object of the present invention to provide an automated apparatus for wire harness production capable of effecting controlled wire lay configuration and of inserting both ends of a wire into respective wire holding devices.

It is still a further object of the present invention to provide an apparatus for automated wire harness production which is operably independent of termination style applied to the wire being manipulated.

It is yet an additional object of the present invention to provide a versatile apparatus for feeding wires in a precisely controlled manner and capable of lateral unloading after wire lay and contact insertion for use in wire harness manufacture.

DESCRIPTION OF THE DRAWINGS

The invention will be more clearly understood by reference to the following detailed description of exemplary embodiments thereof in conjunction with the accompanying drawings, in which.

DETAILED DESCRIPTION OF A PREFERRED EMBODIMENT

Figure 1:
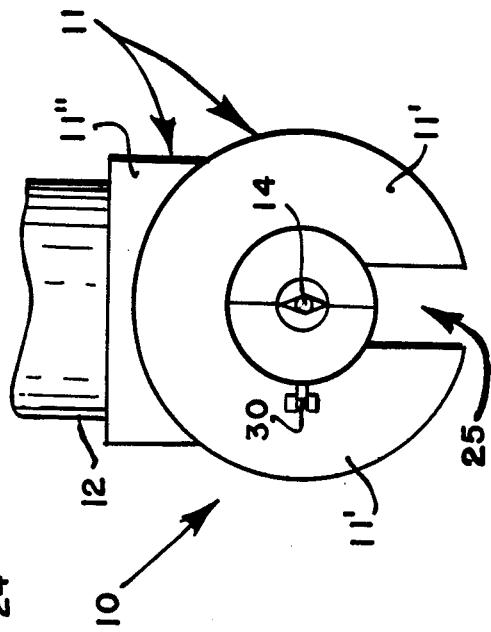
FIG. 1 is a side view of a preferred embodiment of the present invention which has engaged a wire for contact insertion and wire lay effectuation.

Referring now to FIG. 1, there is shown a side view of a preferred embodiment of the present invention which has engaged a wire for contact insertion and wire lay effectuation. The embodiment of the present invention illustrated in FIG. 1 comprises a contact insertion and wire lay robotic end effector apparatus 10 attached to a robot arm 12. Apparatus 10 comprises a housing 11, including a tubular housing portion 11' and an elevated collar 11''. Collar 11'' cooperates with the robot arm 12, as shown. Housing portion 11' defines a wire receiving opening 25, by means of which apparatus 10 can receive a wire 14, or can be extracted from a wire 14, as part of a wire lay and pin insertion cycle.

Figure 2:
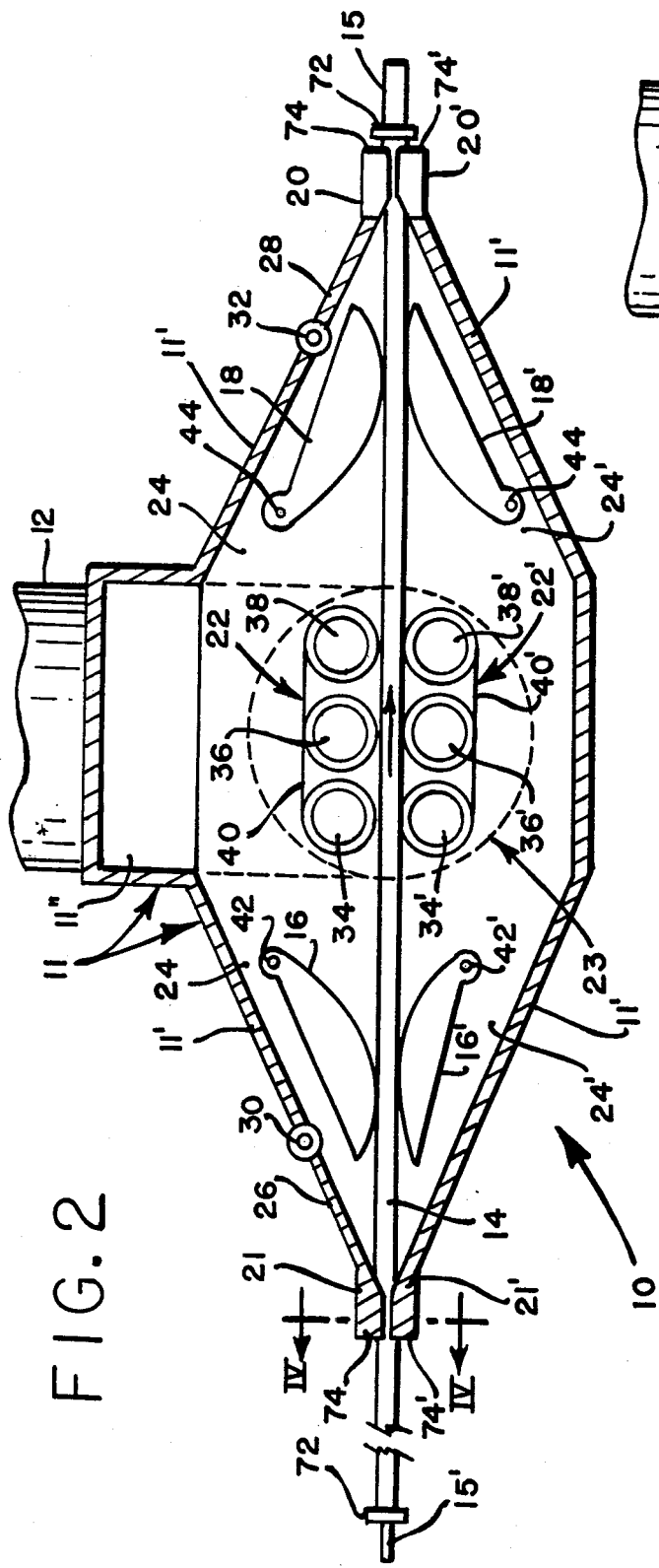
FIG. 2 is a front cross-sectional view of the embodiment of FIG. 1 shown rotated 90° therefrom.

Referring now to FIG. 2, there is shown a front cross-sectional view of the embodiment of FIG. 1 rotated 90°. In the embodiment of FIG. 2, housing portion 11' defines upper and lower, or first and second, housing areas 24, 24' within the interior thereof. Affixed to housing portion 11' at first area 24 are auxilliary wire grips 16, 18. Grips 16, 18 are affixed to housing portion 11' at area 24 by means of pivots 42, 44 respectively. Also affixed to housing portion 11' in area 24 is a wire advance belt drive assembly 22. As well, hinges 30, 32 swingably couple tip jaws 21, 20 to housing portion 11' at area 24 by means of lever arms 26, 28, respectively.

Also shown in FIG. 2, attached to housing portion 11' at lower housing area 24' are auxilliary wire grips 16', 18'. Grips 16', 18' are pivotally coupled to housing portion 11' at area 24' by means of pivots 42', 44', respectively. Tip jaws 21', 20' are coupled to housing portion 11' at area 24', as shown. In addition, a second wire advance belt drive assembly 22' is shown affixed to housing portion 11' at area 24'.

In a preferred embodiment, pivots 42, 42', 44, 44', include resilient means, such as a steel spring (not shown), to urge grippers 16, 18, 16', 18' into a gripping position, and an actuator (not shown), which actuator can selectively drive grippers 16, 18, 16', 18' away from the gripping position, as needed. Thus gripping action of wire grippers 16, 18, 16', 18' can be controlled by solenoid, pneumatic device or the like, to control gripping of wire 14.

As stated above, tip jaws 21, 20 are hingedly coupled to housing portion 11' at area 24. In this manner, tip jaws 21, 20 may be selectively controlled, such as by solenoid, pneumatic actuator or the like (not shown), to effect grasping of a wire between tip jaw pairs 21, 21' and 20, 20'.

Wire 14 is shown in FIG. 2 having a first and second connector 15, 15' affixed to respective ends thereof, and tip jaw pairs 21, 21' and 20, 20' are disposed to grip either the wire 14 or a respective one of the connectors 15, 15' affixed thereto. Connectors 15, 15' may be further provided with an exemplary flange 72, for purposes discussed later.

Belt drive assembly 22 preferably comprises belt 40, drive roller 34 and follower rollers 36 and 38, while belt drive assembly 22' preferrably comprises belt 40', drive roller 34' and follower rollers 36' and 38'. While these belt drive assemblies may be motivated in any conventional manner, as will be understood by those of ordinary skill in the art, it is preferrable that a motor drive comprising a cooperative combination of flexible drive shaft and bevel gears be employed in a manner so as not to interfere with articulation of the apparatus. Furthermore, in an alternative embodiment, one of the belt drive assemblies 22, 22' may be entirely passive, having follower rollers only, such that the passive assembly is driven by driving action upon wire 14 of the other remaining belt drive assembly. In yet another alternative embodiment, the belt drives of FIG. 2, whose direction of wire transmission is shown from side-to-side, may be oriented for front-to-back wire transmission, such that their function is to augment lateral wire loading and unloading, and yet still being able to operate so as not to impede side-to-side wire-traversement by apparatus 10 during wire lay operation. Furthermore, it will be appreciated that preferrably belt drive assembly 22 is moveably coupled to housing portion 11' to facilitate the abovesaid loading and unloading operation.

Also seen in FIG. 2, in dot-dash outline, is a rotational joint 23. This joint cooperates within the invention to permit rotational articulation of apparatus 10, as will be understood by those of ordinary skill in the art.

Figure 3:
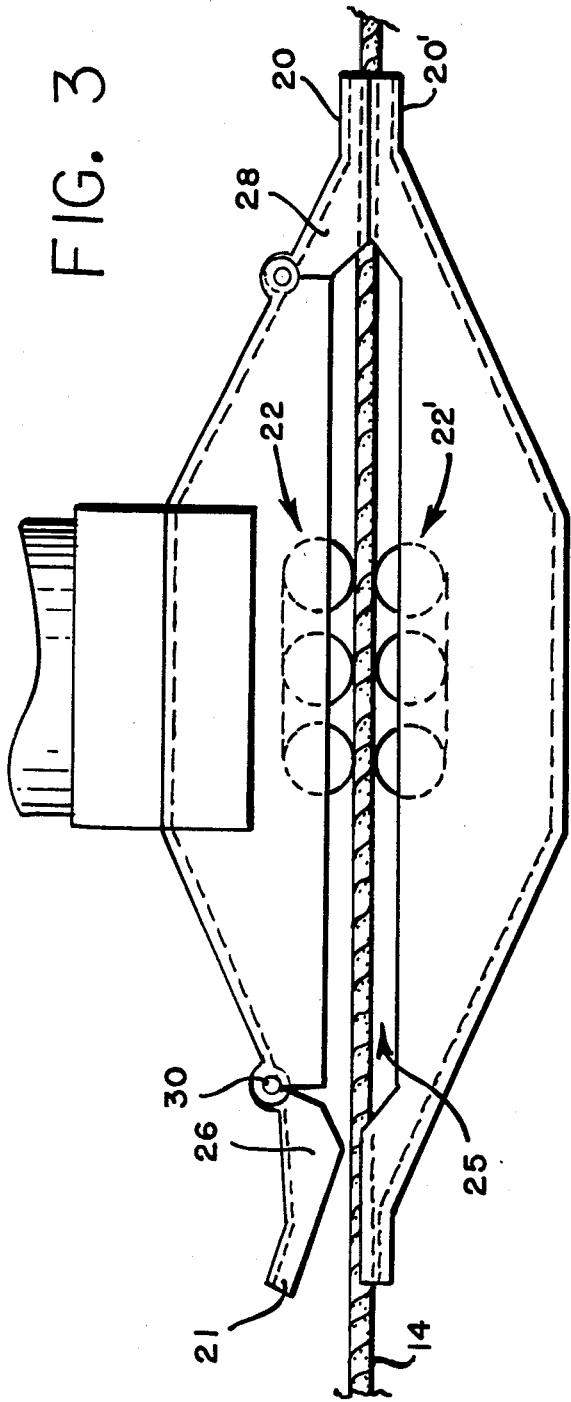
FIG. 3 is a front view of the embodiment of FIG. 1 shown rotated 90° therefrom.

FIG. 3 is a front view of the external configuration of the embodiment of FIG. 2, where the wire-receiving opening of FIG. 1 has been rotated 90 degrees to a horizontal position from the downward position thereof shown in FIG. 1. In FIG. 3, tip jaw 21 is shown pivoted upward at hinge 30 into the wire-loading and unloading condition. Meanwhile, tip jaw 20 is shown in the closed, wire-holding condition where wire 14 is grasped within tip jaw pair 20, 20'. Wire advance belt drive assemblies 22, 22' are shown in dot-dash outline where they are obscured by housing 11; these assemblies, however, are shown in solid outline where viewed through longitudinal opening 25. Wire 14 is also viewed in FIG. 3 through opening 25.

Figure 4:
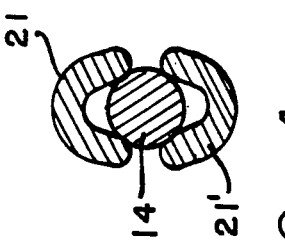
FIG. 4 is a sectional view taken along line IV—IV of FIG. 2, showing an exemplary tip jaw pair securely engaged about an exemplary wire of circular cross-section.

Referring now to FIG. 4 there is shown a sectional view taken along line IV—IV of FIG. 2, showing an exemplary tip jaw pair 21, 21' securely engaged about an exemplary wire 14 of circular cross-section. The tip jaw pair of FIG. 4 is shown engaged about wire 14 for gripping purposes. Such gripping occurs when a respective lever arm 26, 28 is actuated to swing a respective tip jaw 21, 20 into the gripping position.

As seen in FIG. 4, the internal configuration of jaws 21, 21' defines a wire-gripping recessed area, and wire 14 is shown ensconsed within such recessed area. It will be further seen that such defined recessed area in cross-section does not precisely conform to the cross-sectional configuration of wire 14. Nevertheless, it will be understood that adequate gripping is achieved thereat. In fact, the internal cross-sectional configuration of jaws, 21, 21' (and also of jaws 21, 21') is comprised such that a variety of cross-sectional configurations of wire 14 can be advantageously employed within the practice of the present invention, as will be understood by those of ordinary skill in the art. Thus, tip jaw pair 21, 21', and tip jaw pair 20, 20', may comprise any configuration designed for appropriate wire and contact cooperation. Furthermore, as seen in FIG. 1, the tip jaws may further comprise a lip 74, 74', which may be employed for alignment purposes in conjunction with a contact flange 72, in a manner described later.

Figure 5:
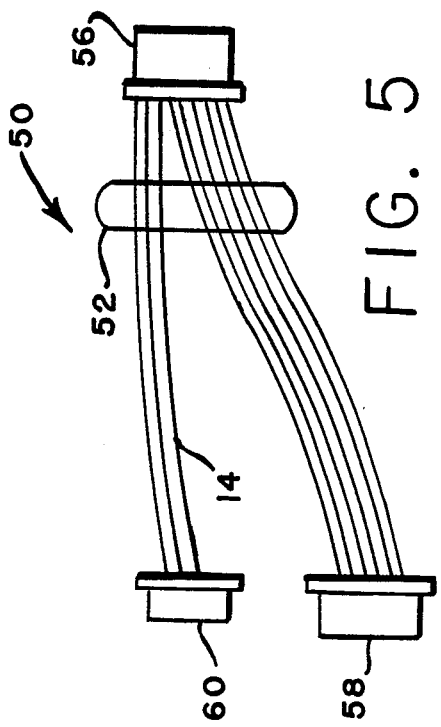
FIG. 5 is a conceptual depiction of an exemplary wire harness comprised of nine wires and three connectors in varying degrees of cooperation manufactured in practice of the present invention.

Referring now to FIG. 5, there is shown a conceptual depiction of an exemplary wire harness comprised of nine wires and three connectors in varying degrees of cooperation. This represents an exemplary wire harness 50 which may be created in practice of the present invention. The wire harness 50 of FIG. 5 comprises a multiplicity of wires 52 including wire 14. Wires 52 are variously terminated at a plurality of connectors, 56, 58, 60. Wire 14 is shown terminated at connectors 56 and 60.

As stated above, wire harness 50 is exemplary, and while in FIG. 5 it comprises nine wires connected variously between three connectors, any number of wires or connectors in any reasonable configuration may be effected in practice of the presently disclosed invention. Furthermore, wire harness 50 may comprise wires 52 of various lengths, where each such wire is pre-fabricated to a desired length with an appropriate contact affixed to its each end. In any event, each individual wire is fed into the apparatus 10 in sequence such that wire lay for each wire can be intelligently performed in a controlled manner and such that the terminated ends of each wire can be inserted into an appropriate connector 56, 58, 60.

In operation of the present invention, apparatus 10 is first urged into a wire receiving condition by operation of control actuators (not shown). Wire receiving may be effected in two basic manners within practice of the present invention. First, a wire 14 may be fed into the apparatus 10 from the side, in through a first pair of open tip jaws, next between a first pair of open auxilliary wire grips, then between the belt drive assemblies, between a second pair of open auxilliary wire grips and then out through the second pair of tip jaws. In this manner, side-loading can be effected. In an alternative embodiment, wire 14 is fed laterally into the device 10 through slot 25.

In a preferred embodiment, tip jaws 21 and 20 auxilliary grips 16, 18, 16', 18', and wire advance belt drive 22 each can be swung away from the wire gripping position, to facilitate receipt of wire 14 either laterally through opening 25 or transversely through the end thereof. After such receipt of wire 14, the tip jaws, grips and drives can be closed about wire 14 to effect secure wire gripping. Wire 14 can thus be gripped between cooperating tip jaw pairs 20, 20' and 21, 21', cooperating auxiliary wire grip pairs 42, 42', and 44, 44' and wire advance belt drive assemblies 22 and 22'.

During the foregoing wire loading operation, care is preferably taken to cause the trailing end of a contact affixed to a selected end of wire 14 to abut lips 74, 74' of one of the pairs of tip jaws. To facilitate such abutment, a contact 15, 15' may be configured with a flange 72. Thus a pair of jaws, such as jaws 20, 20', can be placed in precision abutment with flange 72. A like arrangement obtains with jaws 21, 21'. In this manner, precision contact insertion and wire lay can be achieved in practice of the present invention.

After the apparatus 10 is loaded as aforesaid and is in the condition of securely gripping wire 14, a first contact insertion is immediately performed, assuming both leading and trailing end contact insertion is desired. Thus, contact 15 at tip jaws 20, 20' may be inserted into a pre-selected connector, such as into connecter 56, as shown in FIG. 5. As will be understood by those skilled in the art, any such contact insertion requires that connector 56 be securely held to enable correct and secure contact insertion by robotic movement of apparatus 10, and an appropriate connector-holding jig or the like can be employed to facilitate this function. In any event, in operation of the present invention, contact 15 may be inserted into connector 56 by means of controlled actuation of apparatus 10, and of the robot arm to which apparatus 10 is attached.

After contact 15 is inserted in connector 56, tip jaws 20, 21, auxiliary wire grips 16, 16', 18, 18', and belt drive assembly 22, are controllably manipulated to reduce the gripping action on wire 14. This will permit wire lay to be achieved while the apparatus traverses wire 14 toward the remaining unsecured end of wire 14. Thus, by controlled articulation of apparatus 10, a desired wire lay configuration may be achieved. After wire lay is achieved, a second contact insertion can now be made, wherein contact 15' may be inserted into a connector, such as into connector 60 as seen in FIG. 4, in the manner as aforesaid. Furthermore, where a wire harness having a complex topography is to be constructed, rotating joint 23 can additionally facilitate accurate wire lay.

Upon completion of insertion of contact 15', apparatus 10 is driven into the wire loading condition, as earlier described, for receipt of a next wire to begin a new operational cycle.

It will thus be appreciated by those of ordinary skill in the art that the present invention provides a means of automated assembly of wire harnesses with controlled wire routing, independent of contact style or configuration, where contact insertion after wire lay can be easily effected.

While the present invention has been described in connection with specific embodiments thereof, it will be understood that many modifications and variations will be readily apparent to those of ordinary skill in the art and that this application is intended to cover any adaptation or variations thereof. Therefore, it is manifestly intended that this invention be only limited by the claims and the equivalents thereof.

We claim:

1. A contact insertion and wire lay apparatus, comprising:
    a collar capable of cooperative engagement with a robot arm;
    means coupled to said collar for receiving a wire segment which has a first and second contact affixed thereto, said receiving means including a housing defining an upper and a lower housing section, said sections defining a longitudinal wire-access slot therebetween;
    means coupled to said housing for manipulating said received wire segment into a desired layout, said manipulating means including a drive belt and at least one drive roller; a plurality of auxiliary wire grips for gripping said wire segment, said auxiliary wire grips being in the form of an upper pair of grips pivotally coupled to said upper housing section and a lower pair of grips pivotally coupled to said lower housing section, a first one of said upper and of said lower pair of grips capable of cooperating to grip said wire segment therebetween and a second one of said upper and of said lower pair of grips capable of cooperating to grip said wire segment therebetween; and means for rotating said receiving means; and
    first means coupled to said housing for inserting said first contact of said wire segment into a first connector, and second means coupled to said housing for inserting said second contact of said wire segment into a second connector, wherein each of said inserting means includes a pair of tip jaws defining a wire-segment recess therebetween.

2. A contact insertion and wire lay apparatus as defined in claim 1 wherein said means for rotating said receiving means is capable of rotating said receiving means with respect to said collar.

* * * * *

UNITED STATES PATENT AND TRADEMARK OFFICE
CERTIFICATE OF CORRECTION

PATENT NO. : 4,549,347

DATED : October 29, 1985

INVENTOR(S) : Constantine M. Travlos, et al

It is certified that error appears in the above-identified patent and that said Letters Patent is hereby corrected as shown below:

On the title page  Insert

-- (73) Assignee: The United States of America as represented by the Secretary of the Air Force, Washington, D.C. --.

Signed and Sealed this

Eleventh Day of November, 1986

Attest:

DONALD J. QUIGG

Attesting Officer

Commissioner of Patents and Trademarks